US010128758B1

(12) United States Patent
Price et al.

(10) Patent No.: US 10,128,758 B1
(45) Date of Patent: Nov. 13, 2018

(54) AUTOMATIC PHASE CURRENT BALANCING IN MULTI-PHASE CONVERTERS

(71) Applicant: QUALCOMM Incorporated, San Diego, CA (US)

(72) Inventors: Burt Price, Apex, NC (US); Wenjun Yun, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,982

(22) Filed: Sep. 19, 2017

(51) Int. Cl.
*H02M 3/158* (2006.01)
*H02J 1/10* (2006.01)
*H02M 1/14* (2006.01)

(52) U.S. Cl.
CPC .......... *H02M 3/1584* (2013.01); *H02J 1/102* (2013.01); *H02M 1/14* (2013.01); *H02M 2003/1586* (2013.01)

(58) Field of Classification Search
CPC ................ H02M 3/1584; H02M 1/14; H02M 2003/1586; H02J 1/102
See application file for complete search history.

(56) References Cited

U.S. PATENT DOCUMENTS

| 8,502,515 | B1* | 8/2013 | Wan | H02M 3/1584 323/272 |
|---|---|---|---|---|
| 8,917,077 | B2 | 12/2014 | Lin et al. | |
| 9,203,315 | B2 | 12/2015 | Torti | |
| 2003/0214274 | A1* | 11/2003 | Lethellier | H02M 3/1584 323/272 |
| 2011/0012687 | A1* | 1/2011 | Effler | H02M 3/157 332/110 |
| 2013/0057237 | A1 | 3/2013 | Chen et al. | |
| 2014/0111179 | A1* | 4/2014 | Couleur | H02M 3/1584 323/312 |
| 2016/0187386 | A1 | 6/2016 | El-Damak et al. | |
| 2016/0248328 | A1* | 8/2016 | Zhang | H02M 3/1584 |
| 2017/0192049 | A1* | 7/2017 | Tavernier | G01R 31/2621 |
| 2017/0229961 | A1* | 8/2017 | Zhang | H02M 3/158 |

FOREIGN PATENT DOCUMENTS

WO   WO-2012084389 A2   6/2012

* cited by examiner

*Primary Examiner* — Emily P Pham
(74) *Attorney, Agent, or Firm* — Patterson & Sheridan, L.L.P

(57) ABSTRACT

Certain aspects of the present disclosure are directed to a multi-phase voltage converter. The multi-phase voltage converter generally includes at least two converter stages coupled to an output node of the multi-phase voltage converter. Each of the at least two converter stages generally includes a switch disposed between an input node of the multi-phase voltage converter and the output node, the switch having a first resistance, and an inductive element coupled between the switch and the output node, the inductive element having a second resistance. In certain aspects, the first resistances of the at least two converter stages match and/or the second resistances of the at least two converter stages match.

25 Claims, 6 Drawing Sheets

AUTOMATIC PHASE CURRENT BALANCING IN MULTI-PHASE CONVERTERS

TECHNICAL FIELD

The teachings of the present disclosure relate generally to a circuit, and more particularly, to a voltage converter.

INTRODUCTION

Switch-mode direct-current (DC)-to-DC converters convert a DC source from one voltage to another by charging and discharging an inductor. For example, electromagnetic energy may be stored in the inductor during a charging phase. During a discharging phase, the stored energy of the inductor is transferred to an output load including a load capacitor. The timing of the charging and discharging phases are controlled to regulate the output voltage of the DC/DC converter. DC/DC converters are typically more power efficient than linear converters and may be used in portable electronic devices, such as cellular phones and laptop computers, which are supplied power from a battery.

BRIEF SUMMARY OF SOME EXAMPLES

Certain aspects of the present disclosure are generally directed to switch-mode voltage regulators.

Certain aspects of the present disclosure provide a multi-phase voltage converter. The multi-phase voltage converter includes at least two converter stages coupled to an output node of the multi-phase voltage converter. Each of the at least two converter stages generally includes a switch disposed between an input node of the multi-phase voltage converter and the output node, the switch having a first resistance; and an inductive element coupled between the switch and the output node, the inductive element having a second resistance, wherein at least one of the first resistances of the at least two converter stages match or the second resistances of the at least two converter stages match.

Certain aspects of the present disclosure provide a multi-phase voltage converter. The multi-phase voltage converter generally includes at least two converter stages coupled to an output node of the multi-phase voltage converter, and a feedback path coupled between the output node and inputs of the at least two converter stages, the feedback path comprising at least one high-frequency (HF) filter.

Certain aspects of the present disclosure provide a method for fabricating a multi-phase voltage converter. The method generally includes disposing a first switch between a first input node and an output node of the multi-phase voltage converter, the first switch having a first resistance; disposing a first inductive element between the first switch and the output node, the first inductive element having a second resistance; disposing a second switch between a second input node and the output node of the multi-phase voltage converter, the second switch having a third resistance; disposing a second inductive element between the second switch and the output node, the second inductive element having a fourth resistance, wherein at least one of: the first resistance and the third resistance match; or the second resistance and the fourth resistance match.

Certain aspects of the present disclosure provide a method for voltage conversion. The method generally includes generating an output signal at an output node of a multi-phase voltage converter using at least two converter stages coupled to the output node, filtering the output signal with a high-frequency filter to generate a filtered signal, comparing the filtered signal with a reference signal, and generating drive signals for the at least two converter stages based on the comparison.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Certain aspects of the present disclosure are generally directed to phase current balancing for direct-current (DC)-to-DC (DC/DC) converters. Components of DC/DC converters have parasitic elements (e.g., parasitic resistance and inductance) that may impact their efficiency. Thus, reducing these parasitics may improve the efficiency of the DC/DC converter. However, it may be difficult to reduce these parasitics when the DC/DC converter is implemented on-die. Certain aspects of the present disclosure take advantage of the parasitics of the DC/DC converter to promote phase current balancing. For example, in certain aspects, the parasitics of the DC/DC converter may be used to achieve balancing of the currents in each converter phase through matching of the parasitics.

Figure 1:
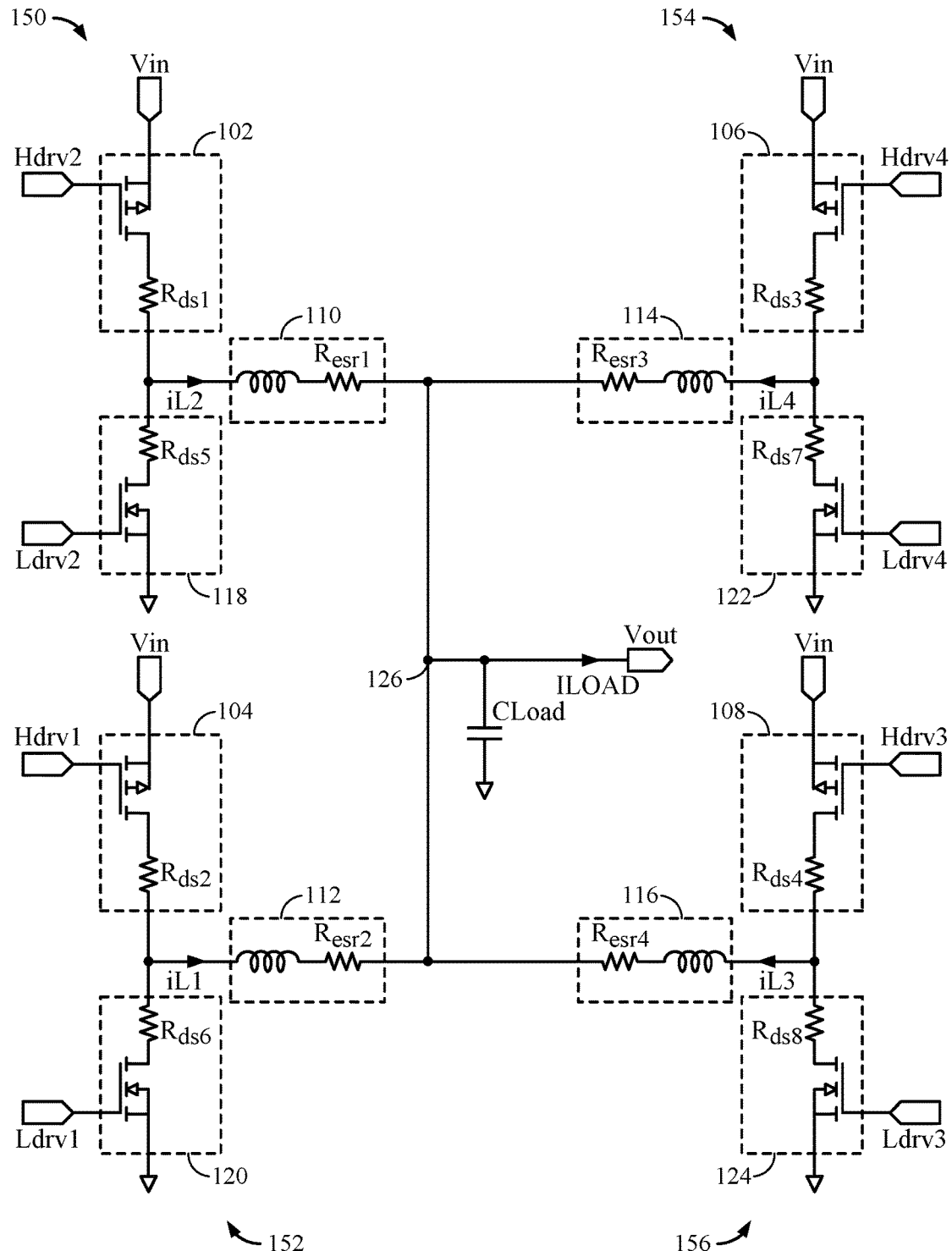
FIG. 1 illustrates an example direct current (DC)-to-DC (DC/DC) converter, in accordance with certain aspects of the present disclosure.

FIG. 1 is a schematic diagram of an example buck DC/DC converter 100 with multiple converter phases (i.e., stages) 150, 152, 154, and 156, in accordance with certain aspects of the present disclosure. While FIG. 1 illustrates a buck DC/DC converter 100 with four converter phases 150, 152, 154, and 156 as an example to facilitate understanding, aspects of the present disclosure may be applied to any DC/DC converter with at least two converter phases.

In an effort to reduce the chip area when the DC/DC converter 100 is implemented on-die (e.g., integrated circuit (IC)), the size of transistors of the DC/DC converter 100 may be decreased. This has the effect of reducing the switching losses, but also increasing the conduction losses of the transistors since the on-resistances of the transistors are increased. Thus, a compromise may be reached between total system efficiency and on-die area. In addition, it may be difficult to decrease the equivalent series resistance (ESR) of inductors that are small enough in size to either be integrated on chip, made part of the package, or are physically small enough to be discrete parts mounted on the package. Certain aspects of the present disclosure take advantage of parasitic resistances and/or other parasitics to promote automatic phase current balancing.

Each of the four converter phases of the DC/DC converter 100 includes a transistor 102, 104, 106, or 108, each including a drain-to-source parasitic resistance represented by resistor $R_{ds1}$, $R_{ds2}$, $R_{ds3}$, or $R_{ds4}$, respectively. Each of the four converter phases of the DC/DC converter 100 also includes an inductor 110, 112, 114, or 116, each inductor including an equivalent series resistance (ESR) represented by resistor $R_{esr1}$, $R_{esr2}$, $R_{esr3}$, or $R_{esr4}$. The transistors 102, 104, 106, and 108 are configured to drive current and charge respective inductors 110, 112, 114, and 116 during an on-state of each converter phase.

In certain aspects, each of the DC/DC converter phases may include a transistor 118, 120, 122, or 124 coupled between a respective inductor 110, 112, 114, or 116 and a reference potential node (e.g., electric ground). The transistors 118, 120, 122, and 124 allow for current flow to the output node 126 during an off-state of the DC/DC converter 100. Each of the transistors 118, 120, 122, or 124 may also include a drain-to-source parasitic resistance $R_{ds5}$, $R_{ds6}$, $R_{ds7}$, or $R_{ds8}$. The transistors of the example DC/DC converter 100 are implemented using field-effect transistors (FETs), but other types of transistors may be used. In certain aspects, the transistors 118, 120, 122, and 124 may be replaced by diodes (referred to as flywheel diodes).

To improve the efficiency of the DC/DC converter 100, the inductor currents iL1, iL2, iL3 and iL4 may be equalized. In some cases, the inductor current iL1, iL2, iL3 or iL4 of each converter phase may be measured and adjusted accordingly (e.g., by adjusting circuit operations in an effort to equalize the inductor currents). In certain aspects of the present disclosure, the parasitics of the DC/DC converter 100 may be used to equalize the inductor currents of the converter phases. For example, the inductor currents of the converter phases may be matched (e.g., within some desired tolerance, such as ±5%) by setting the inductor ESR $R_{esr1}$, $R_{esr2}$, $R_{esr3}$, or $R_{esr4}$ of each converter phase; the high side transistor drain-to-source resistance $R_{ds1}$, $R_{ds2}$, $R_{ds3}$, or $R_{ds4}$ of each converter phase; and/or the low side transistor drain-to-source resistance $R_{ds5}$, $R_{ds6}$, $R_{ds7}$, or $R_{ds8}$ of each converter phase, to match their counterparts in each of the other converter phases. These parasitic resistances may be set during the design of the DC/DC converter 100 by controlling design parameters such as the IC layout and/or selection of components for the DC/DC converter 100. The DC/DC converter 100 may also be configured such that these parasitic resistances are not so small that they have little to no effect on the inductor currents. The larger these parasitic resistances are, the faster the balancing of the inductor currents takes place.

Figure 2:
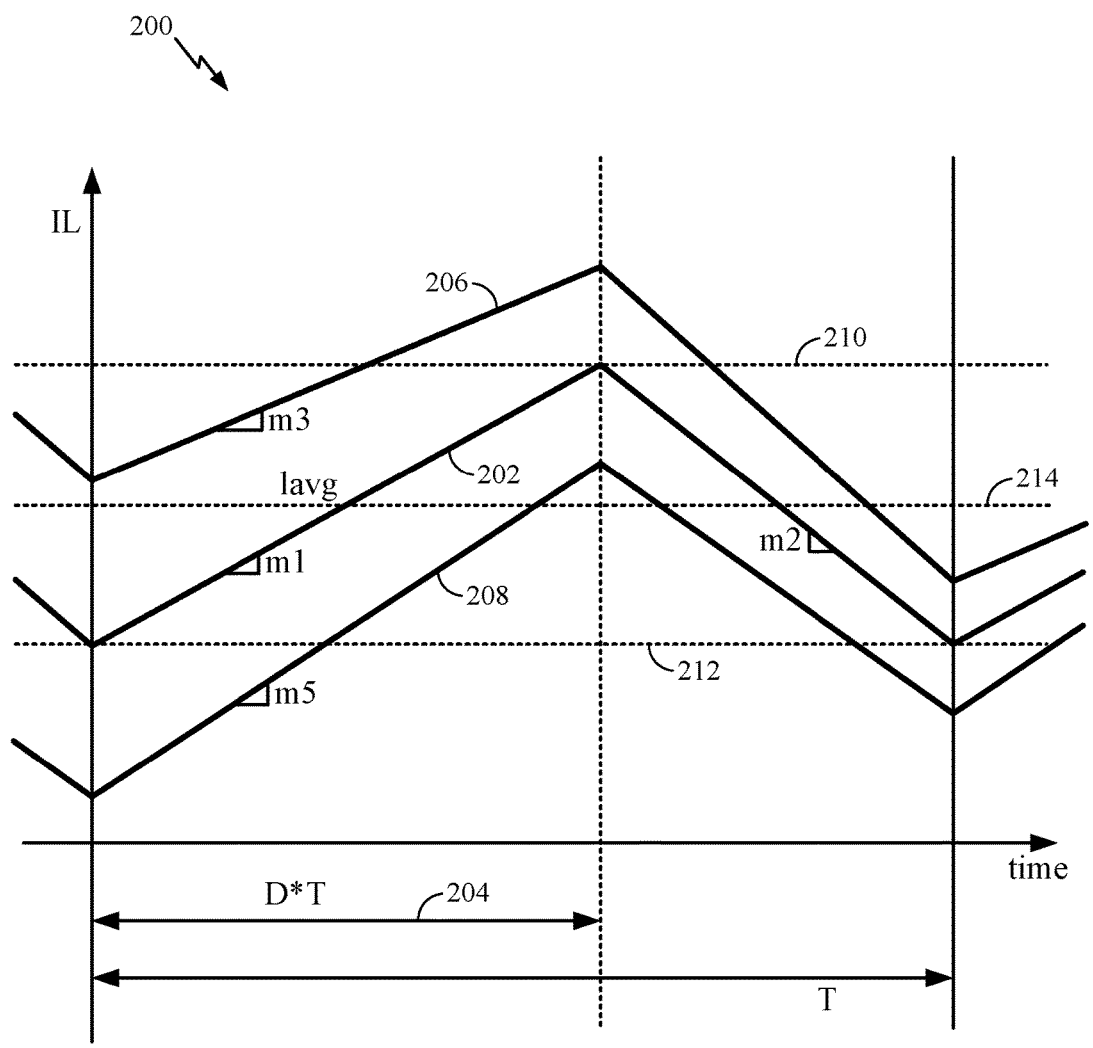
FIG. 2 is a graph illustrating example charging and discharging current of an inductor of the DC/DC converter of FIG. 1, in accordance with certain aspects of the present disclosure.

FIG. 2 is a graph 200 illustrating example charging and discharging currents IL of an inductor of the DC/DC converter 100 as a function of time. In certain aspects, a DC/DC converter 100 may be configured to set the duty cycle D to be equal for all phases of the DC/DC converter 100, and charging and discharging phases of each converter phase may be phase shifted based on the number of converter phases (e.g., four converter phases for the DC/DC converter 100 may have a phase shifting of) 90°.

The curves 202, 206, and 208 represent the inductor current IL of the DC/DC converter 100, for one of the four converter phases 150, 152, 154, and 156, during operating conditions having different average inductor currents. The curve 202 represents the inductor current IL during a steady state of the DC/DC converter 100 when the average inductor current (Iavg) (represented by line 214) (e.g., for converter phase 150) is about equal to the load current (ILOAD) divided by the total number of phases (e.g., ILOAD/4 in the example DC/DC converter 100). When a high side transistor (e.g., transistor 102) is on, the corresponding inductor (e.g., inductor 110) is charged as shown by the increasing IL at a slope m1. After time period 204 (e.g., the duty cycle D times the total charge/discharge time (T)), the high side transistor is turned off, and the low side transistor (e.g., transistor 118) is turned on, resulting in the inductor current discharging with a slope m2.

Curve 206 represents the inductor current IL when the average inductor current (e.g., represented by line 210) is greater than Iavg (e.g., ILOAD/4), and curve 208 represents the inductor current when the average inductor current (e.g., represented by line 212) is less than Iavg. The inductor current increases with a slope of m3 when the average inductor current is greater than Iavg (e.g., ILOAD/4) and increases with a slope of m5 when the average inductor current is less than Iavg. As illustrated, slope m3 is less than the slope m1, whereas slope m5 is greater than the slope m1. Therefore, in both cases—namely when the average inductor current is greater than Iavg (e.g., ILOAD/4) and when the average inductor current is less than Iavg—the average value of the inductor current is driven towards Iavg, resulting in a balancing of the inductor currents across the multiple converter phases.

This is at least in part caused by the parasitic resistances described above with respect to FIG. 1. For example, when a converter phase has a larger average inductor current than Iavg, that converter phase develops a larger average voltage drop across its respective parasitic resistances (e.g., $R_{esr1}$ of FIG. 1), which in turn reduces voltage across the corresponding inductor during the power stroke (e.g., when the high-side transistor 102 is on), resulting in a decrease in the average inductor current for that converter phase. In other words, the slope m3 is less than slope m1 and slope m5 because there is less voltage across the corresponding inductor due to the higher inductor current and resultant increase in the voltage drop across the parasitic resistances.

Likewise, for a phase that has a smaller average inductor current than Iavg, that phase will develop a smaller average voltage drop across the parasitic resistances which will then allow for more voltage, and therefore, more volt-seconds for that inductor during the power stroke, resulting in an increase in the average inductor current. Thus, the larger the voltage developed across the parasitic resistances, as a percentage of the total voltage difference between Vin and Vout shown in FIG. 1, the faster the currents will balance between the different converter phases.

Figure 3:
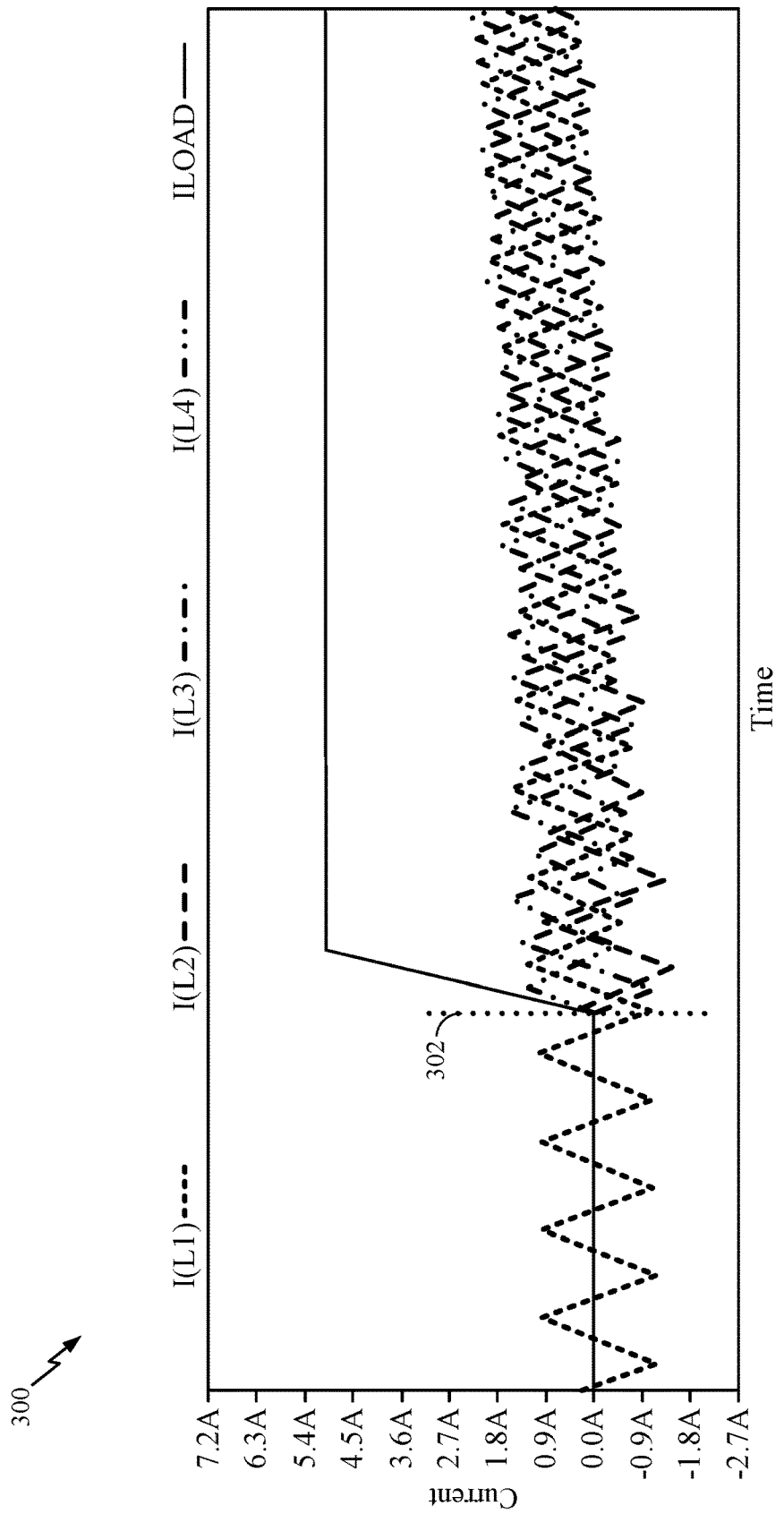
FIG. 3 is a graph illustrating example inductor currents of a DC/DC converter, in accordance with certain aspects of the present disclosure.

FIG. 3 is a graph 300 illustrating example inductor currents of the four converter phases of the example DC/DC converter 100 with time, in accordance with certain aspects of the present disclosure. Initially, only a single phase of the DC/DC converter 100 is active with little load current ILOAD, followed by the activation of all four phases at time 302 which coincides with an increase in ILOAD. As illustrated, in about six cycles, the inductor currents of the different phases become fairly balanced due to the effect of the parasitic resistances as previously discussed.

Certain aspects of the present disclosure provide for matching of these parasitic resistances for corresponding components of different converter stages of the DC/DC converter 100 to promote automatic phase current balancing. For example, the corresponding component parasitic resistances between converter phases may be matched and designed to have sufficient parasitic resistances to allow for phase current balancing. In other words, parasitic resistances $R_{ds1}$, $R_{ds2}$, $R_{ds3}$, and $R_{ds4}$ may be matched, $R_{ds5}$, $R_{ash}$, $R_{asp}$, $R_{ds8}$ may be matched, and/or $R_{esr1}$, $R_{esr2}$, $R_{esr3}$, and $R_{esr4}$ may be matched (e.g., within some desired tolerance, such as ±5%). In certain aspects, the matching of the parasitic resistances may extend to the wiring resistances for the half H-bridge and/or inductors if these resistances were appreciable in comparison with the transistor resistances and the inductors' ESRs.

In certain aspects, the current of each converter phase may be limited. For example, the voltage across the high side transistor (e.g., transistor 102, 104, 106, or 108) of each of the converter phases may be monitored when the high side transistor is turned on, and the current of the converter phase may be controlled. Having per-phase current limiting may prevent any phase's inductor current from getting too large and prevent any phase from current hogging. Certain aspects of the present disclosure also provide for matching of the duty cycles between the different converter phases. For example, the duty cycles of the pulse-width modulated (PWM) signals used to drive the different converter stages may also be matched to promote automatic phase current balancing.

Figure 4:
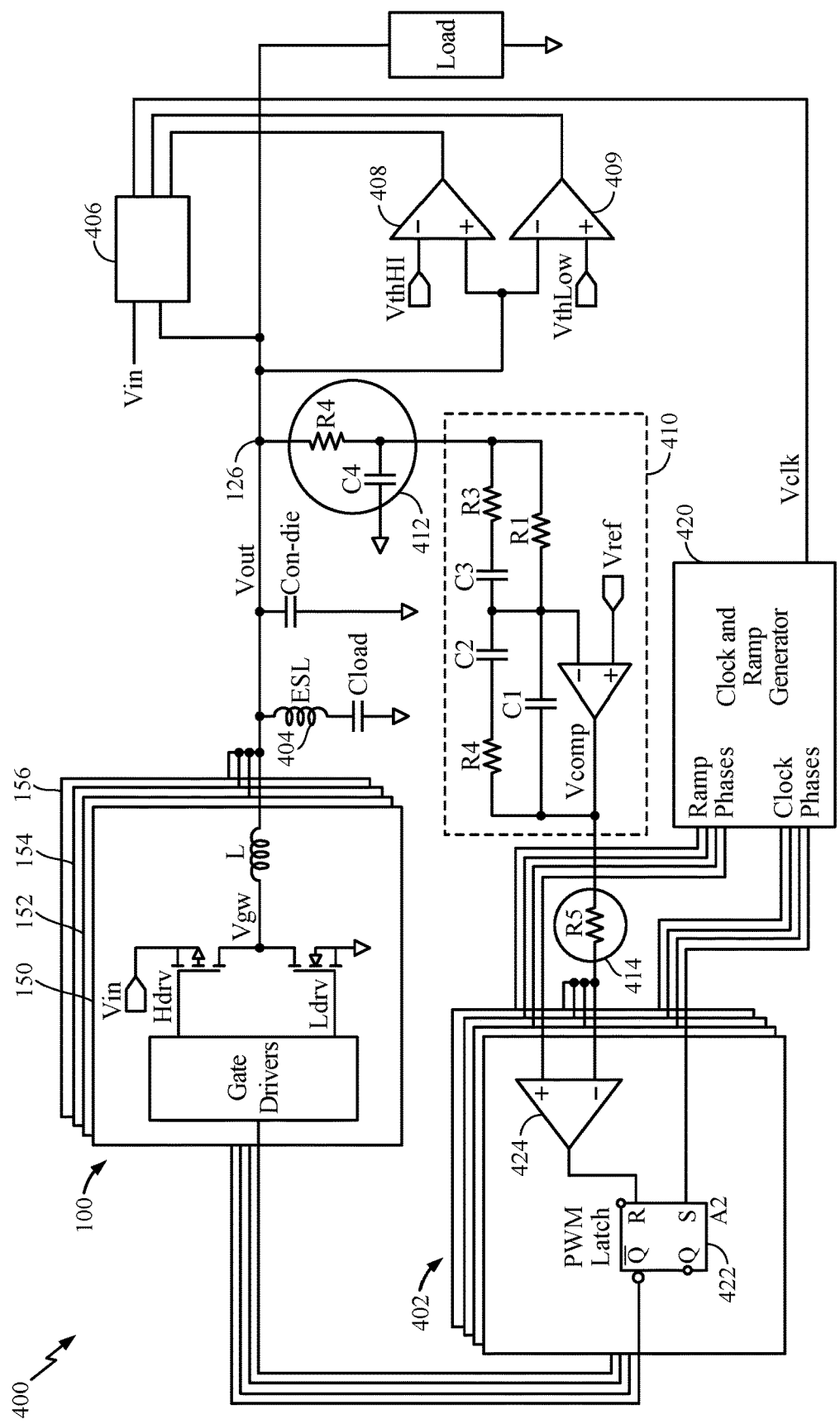
FIG. 4 illustrates a circuit including a feedback path for the DC/DC converter of FIG. 1, in accordance with certain aspects of the present disclosure.

FIG. 4 illustrates a circuit 400 including a feedback path for the DC/DC converter 100, in accordance with certain aspects of the present disclosure. As illustrated, the feedback path includes different PWM signal modulators 402, one for each of the converter stages of the DC/DC converter 100. Each of the PWM signal modulators may be implemented using a pulse-width modulation (PWM) latch 422 (e.g., a set-reset (SR) latch) and a comparator 424.

The circuit 400 also includes a voltage regulator 406 (e.g., implemented as an asynchronous transient response accelerator (TRA)) and comparators 408 and 409. The comparator 409 monitors the voltage at the output node 126 and detects whether the output voltage Vout is drooping. If Vout droops below a lower threshold voltage VthLow, the comparator 409 signals to the voltage regulator 406 to source current to the output node 126 in an effort to increase the output voltage Vout.

In certain aspects, VthLow may be set below the minimum ripple voltage excursion at the output node 126 with margin to prevent nuisance tripping and the negative effect it would have on the efficiency of the DC/DC converter 100.

Moreover, the comparator 408 may also compare the output voltage to a higher threshold voltage (VthHi), where VthHi is greater than VthLow. If the output voltage surpasses VthHi, the comparator 408 may signal to the voltage regulator 406 to sink current from the output node 126, reducing the output voltage, or otherwise stop any sourcing of current to the output node 126. In certain aspects, the voltage regulator 406 may also receive a clock signal (Vclk) from the clock and ramp generator 420. The clock and ramp generator 420 may generate the ramp phases (e.g., triangle waves) for the PWM signal modulators 402, and may provide clock phases to the PWM latches of the PWM signal modulators 402 for synchronization.

In certain aspects, the load capacitor Cload may include a parasitic inductance 404 (e.g., equivalent series inductance (ESL)), which if large enough in size, can interfere with the phase current balancing process. This is a result of the ringing voltage at the output node 126 that the parasitic inductance 404 causes. Thus, reducing the parasitic inductance 404 in capacitor Cload reduces the ringing voltage. In certain aspects, the capacitor Cload may be implemented off-chip, in which case the parasitic inductance 404 is also off-chip. The ripple current of each inductor may flow through the parasitic inductance 404, causing additional ripple voltage at the output node 126.

If the phase signals that are generated by the PWM signal modulator 402 are properly and evenly phase shifted, the size of the ripple voltage developed across parasitic inductance 404 may be reduced. Therefore, the phase drive signals may be kept evenly phase shifted with respect to each other. The additional ripple voltage developed by the parasitic inductance 404 adds to the ripple voltage generated due to the combined inductor currents charging and discharging the load capacitance Cload.

In certain aspects, the feedback path of the circuit 400 may include an error amplifier 410. The error amplifier 410 generates a signal Vcomp representing an error between the output voltage Vout and a reference voltage. The duty cycles of the PWM signals used to drive the DC/DC converter 100 are then adjusted until the output voltage Vout is about equal to the reference voltage Vref.

In some cases, the error amplifier 410 may have high frequency paths that allow high frequency signals (e.g., the ripple voltage) to disturb the output of the error amplifier 410, which then change the timing of the individual PWM signal modulator outputs, making the phase shifts between the phase drive signals uneven and cause a larger ripple voltage. The larger ripple voltage again impacts the voltage at the output of the error amplifier 410 due to the high frequency sneak paths, further disturbing the timing of the individual PWM signal modulators. This results in a disturbance of the overall feedback loop at around the switching frequency of the DC/DC converter 100 that may interfere with automatic phase current balancing.

Certain aspects of the present disclosure provide one or more high-frequency (HF) filters to filter out these high frequency signals from impacting the PWM signal modulator 402. For example, the circuit 400 may include a HF filter 412 (e.g., a low-pass filter) at the input of the error amplifier 410 and/or a resistive element 414 (e.g., effectively an HF filter) at the output of the error amplifier 410, as illustrated. In certain aspects, the HF filter 412 may be a first order low-pass filter implemented using a resistor R4 and a capacitor C4, as illustrated. The resistive element 414 provides additional HF filtering when operating in conjunction with the input capacitance of the comparators of the PWM signal modulators 402.

In certain aspects, the cutoff frequency (e.g., the −3 dB frequency) for the HF filter 412 may be set below the switching frequency of the DC/DC converter 100, but above the 0 dB crossover frequency of the error amplifier 410. For example, with a converter switching frequency of 140 MHz and a 0 dB crossover frequency for the error amplifier 410 of 1.7 MHz, a filter frequency of 25 MHz may be used to suppress frequencies of signal components that would otherwise sneak through the error amplifier 410 and allow the individual phase drive signals to be generated with the desired phase shifts. This, in turn, may reduce the output ripple voltage, which reduces the amplitude of the HF output ripple and may allow for automatic phase current balancing to take place.

The voltage regulator 406 works in parallel with the DC/DC converter 100 to regulate the output voltage because the feedback loop of the DC/DC converter 100 may not be fast enough to handle the droops caused by full scale load steps. Making the error amplifier 410 faster to handle such transients may exacerbate the HF sneak path issue. Thus, certain aspects of the present disclosure provide a DC/DC converter 100 operated at a frequency that is high enough above the 0 dB crossover frequency of the error amplifier 410 to allow the insertion of the HF filter (e.g., the HF filter 412 and/or resistive element 414), and then relegating droop mitigation to a parallel regulator such as the voltage regulator 406. This technique may be especially useful when the capacitor Cload cannot be made large enough to sufficiently mitigate the drooping of the output voltage Vout.

As discussed, certain aspects of the present disclosure provide for setting the various converter phases of the DC/DC converter 100 to have matched inductances (e.g., within some desired tolerance, such as in a range from ±1% to ±4%), matched parasitic resistances in the inductors and half H-bridge drivers, as well as matching the components in the PWM signal modulators to match the duty cycle of the PWM signals provided for the converter phases of the DC/DC converter 100. In addition, the inclusion of a HF filter in the feedback path allows for proper phase generation and duty cycle matching.

Figure 5:
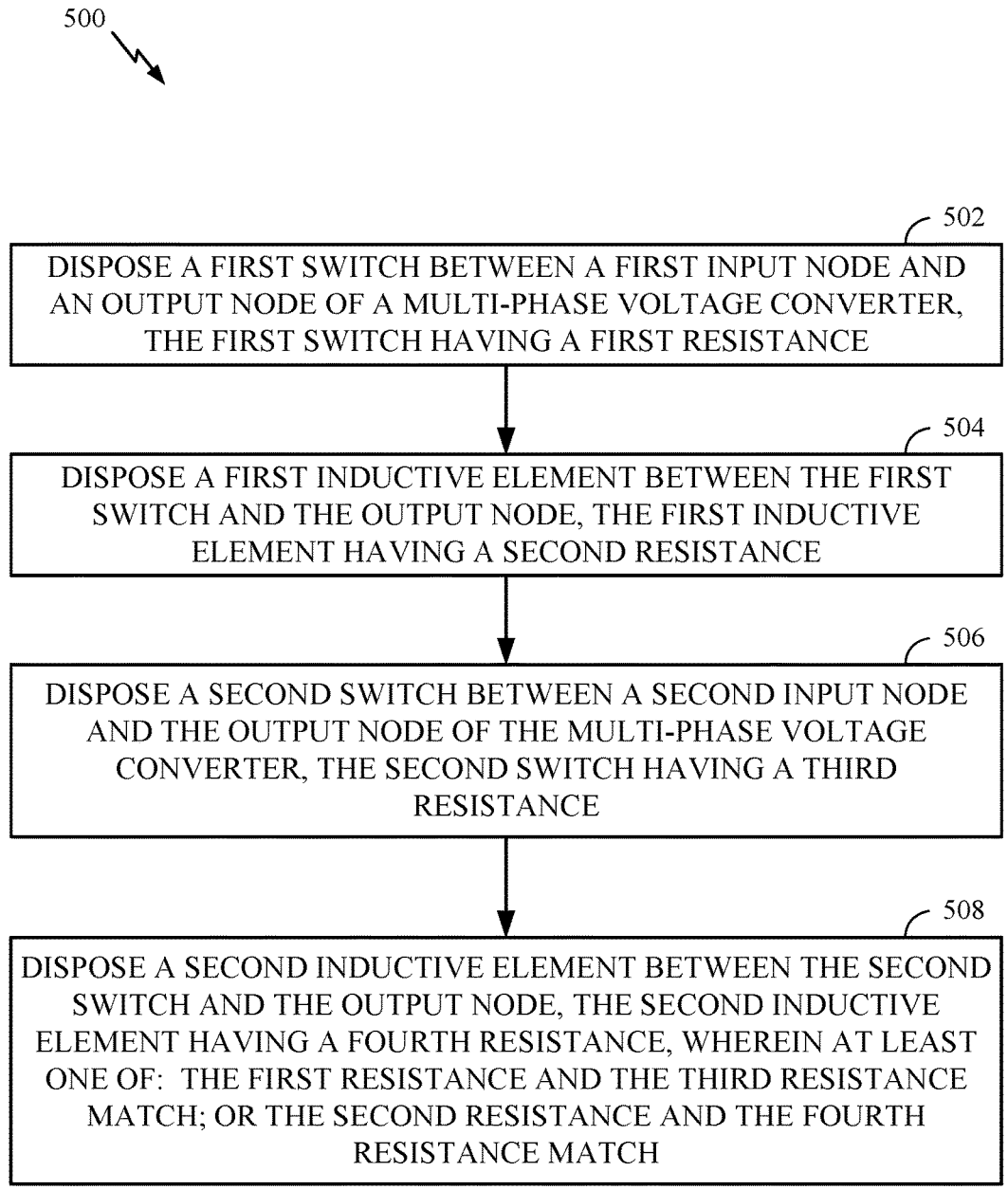
FIG. 5 is a flow diagram of example operations for fabricating a multi-phase voltage converter, in accordance with certain aspects of the present disclosure.

FIG. 5 is a flow diagram illustrating example operations 500 for fabricating a multi-phase voltage converter, in accordance with certain aspects of the present disclosure. The operations 500 may be performed by a manufacturing facility, which may include a semiconductor-processing chamber, for example.

The operations 500 may begin, at block 502, by disposing a first switch (e.g., transistor 102) between a first input node (e.g., node providing input voltage Vin) of the multi-phase voltage converter and an output node (e.g., output node 126) of the multi-phase voltage converter, the first switch having a first resistance (e.g., parasitic resistance $R_{ds1}$), and at block 504, disposing a first inductive element (e.g., inductor 110) between the first switch and the output node, the first inductive element having a second resistance (e.g., ESR Resr1). At block 506, a second switch (e.g., transistor 104) may be disposed between a second input node (e.g., node providing input voltage Vin) of the multi-phase voltage converter and the output node, the second switch having a third resistance (e.g., parasitic resistance $R_{ds2}$), and at block 508, a second inductive element (e.g., inductor 112) may be disposed between the second switch and the output node, the second inductive element having a fourth resistance (e.g., ESR $R_{esr2}$). In certain aspects of the present disclosure, the first resistance and the third resistance may match and/or the second resistance and the fourth resistance may match.

In certain aspects, the inductances of the first inductive element and the second inductive element may match. In some cases, the operations 500 may also include disposing a third switch (e.g., transistor 118) between a first reference potential node and a first switching node coupled to the first switch and to the first inductive element, the third switch having a fifth resistance (e.g., parasitic resistance $R_{ds5}$), and disposing a fourth switch (e.g., transistor 120) between a second reference potential node and a second switching node coupled to the second switch and to the second inductive element, the third switch having a sixth resistance (e.g., parasitic resistance $R_{ds6}$), wherein the fifth resistance and the sixth resistance match.

Figure 6:
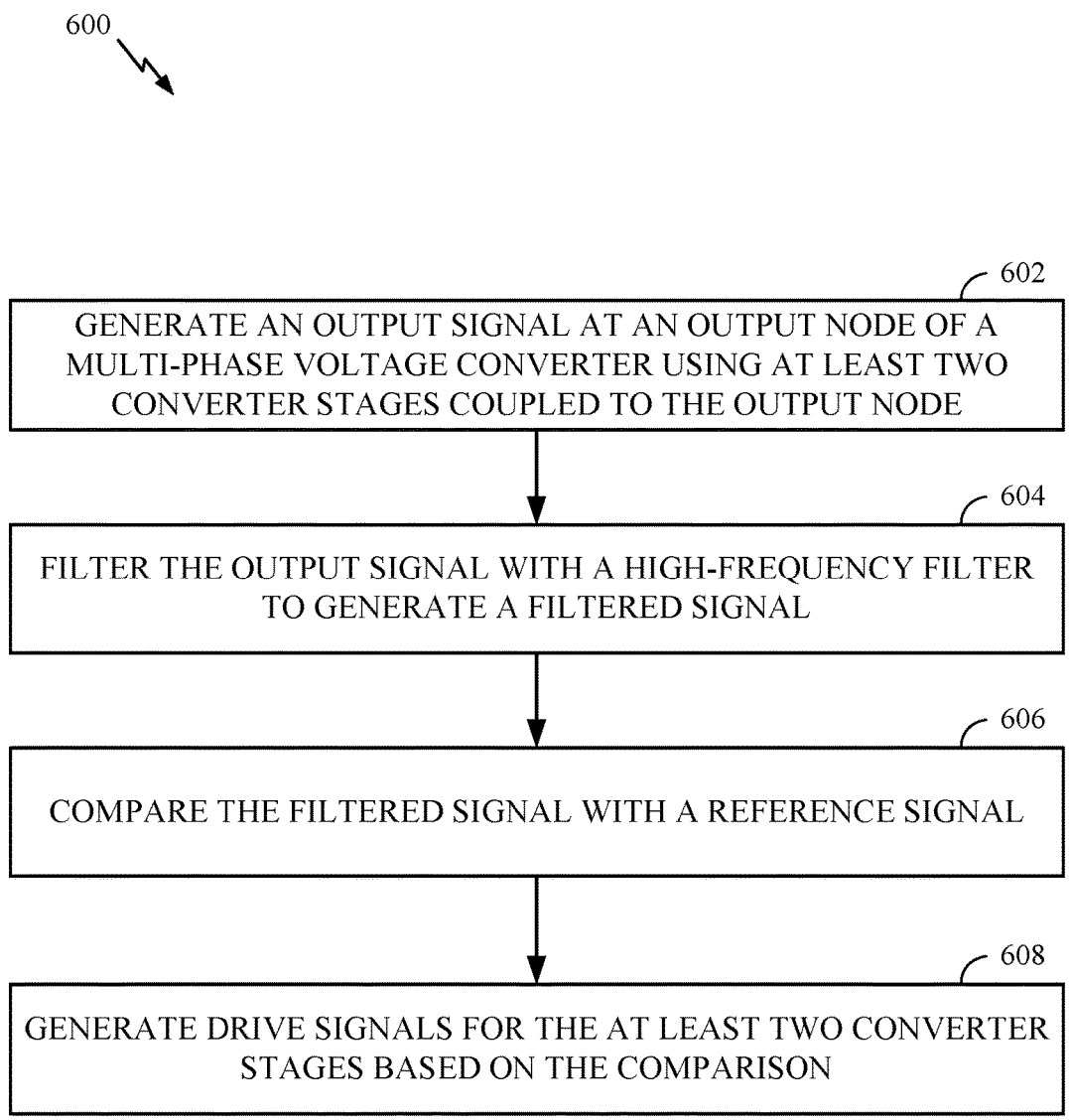
FIG. 6 is a flow diagram of example operations for voltage conversion, in accordance with certain aspects of the present disclosure.

FIG. 6 is a flow diagram illustrating example operations 600 for voltage conversion, in accordance with certain aspects of the present disclosure. The operations 600 may be performed by a circuit, such as the circuit 400 of FIG. 4.

The operations 600 may begin, at block 602, by generating an output signal at an output node of a multi-phase voltage converter using at least two converter stages coupled to the output node, and at block 604, filtering the output signal with a high-frequency filter generate a filtered signal. At block 606, the circuit compares the filtered signal with a reference signal, and at block 608, generates drive signals for the at least two converter stages based on the comparison. In certain aspects, the comparing comprises generating a comparison signal (e.g., signal Vcomp) based on the comparison between the filtered signal and the reference signal. In this case, the operations 600 also includes filtering a high-frequency component of the comparison signal to generate another filtered signal, wherein the drive signals are generated based on the other filtered signal. In some cases, the drive signals comprise pulse-width modulated (PWM) signals having matching duty cycles.

Matching of the parasitics as discussed herein promotes automatic phase current balancing. The parasitics may be matched to within a tolerance, such as ±5%, but matching the parasitics with a tighter tolerance provides even further improvement of phase currents balancing.

In some configurations, the term(s) "communicate," "communicating," and/or "communication" may refer to "receive," "receiving," "reception," and/or other related or suitable aspects without necessarily deviating from the scope of the present disclosure. In some configurations, the term(s) "communicate," "communicating," "communication," may refer to "transmit," "transmitting," "transmission," and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

What is claimed is:

1. A multi-phase voltage converter comprising:
at least two converter stages coupled to an output node of the multi-phase voltage converter, each of the at least two converter stages comprising:
a switch disposed between an input node of the multi-phase voltage converter and the output node, the switch having a first resistance; and
an inductive element coupled between the switch and the output node, the inductive element having a second resistance, wherein at least one of:
the first resistances of the at least two converter stages match; or
the second resistances of the at least two converter stages match.

2. The multi-phase voltage converter of claim 1, wherein inductances of the inductive elements of the at least two converter stages match.

3. The multi-phase voltage converter of claim 1, wherein each of the at least two converter stages further comprises:
another switch coupled between a reference potential node and a switching node coupled to the switch and to the inductive element, the other switch having a third resistance, wherein the third resistances of the at least two converter stages match.

4. The multi-phase voltage converter of claim 3, wherein in each of the at least two converter stages, the third resistance comprises a parasitic resistance of the other switch.

5. The multi-phase voltage converter of claim 1, wherein in each of the at least two converter stages, the first resistance comprises a parasitic resistance of the switch and the second resistance comprises a parasitic resistance of the inductive element.

6. The multi-phase voltage converter of claim 1, wherein duty cycles of pulse-width modulation (PWM) signals used to drive the at least two converter stages are configured to match.

7. The multi-phase voltage converter of claim 1, further comprising a pulse-width modulation (PWM) signal modulator for each of the at least two converter stages, each of the PWM signal modulators being configured to generate a PWM signal to drive one of the at least two converter stages, wherein the PWM signal modulators are configured such that duty cycles of the PWM signals match.

8. The multi-phase voltage converter of claim 1, further comprising:
a feedback path coupled between the output node and inputs of the at least two converter stages, the feedback path comprising at least one high-frequency (HF) filter.

9. The multi-phase voltage converter of claim 8, wherein the feedback path further comprises:
an error amplifier having an output coupled to at least two pulse-width modulation (PWM) signal modulators, each of the at least two PWM signal modulators being coupled to one of the at least two converter stages, wherein the at least one HF filter is coupled between the output node and the error amplifier.

10. The multi-phase voltage converter of claim 9, further comprising a resistive element coupled between the output of the error amplifier and inputs of the at least two PWM signal modulators.

11. The multi-phase voltage converter of claim 9, wherein the at least one HF filter is configured such that a cutoff frequency of the at least one HF filter is less than a switching frequency of the multi-phase voltage converter, and above a 0 dB crossover frequency of the error amplifier.

12. The multi-phase voltage converter of claim 1, further comprising:
  a voltage regulator configured to compare a voltage at the output node to a reference voltage and provide a current to the output node based on the comparison.

13. The multi-phase voltage converter of claim 1, further comprising an integrated circuit, the integrated circuit comprising the at least two converter stages.

14. A multi-phase voltage converter comprising:
  at least two converter stages coupled to an output node of the multi-phase voltage converter; and
  a feedback path coupled between the output node and inputs of the at least two converter stages, the feedback path comprising at least one high-frequency (HF) filter, wherein the feedback path comprises an error amplifier having an output coupled to at least two pulse-width modulation (PWM) signal modulators, each of the at least two PWM signal modulators being coupled to one of the at least two converter stages, wherein the at least one HF filter is coupled between the output node and the error amplifier; and
  a resistive element coupled in series between the output of the error amplifier and inputs of the at least two PWM signal modulators.

15. The multi-phase voltage converter of claim 14, wherein the HF filter is configured such that a cutoff frequency of the at least one HF filter is less than a switching frequency of the multi-phase voltage converter, and above a 0 dB crossover frequency of the error amplifier.

16. The multi-phase voltage converter of claim 14, wherein each of the at least two converter stages comprises:
  a switch disposed between an input node of the multi-phase voltage converter and the output node, the switch having a first resistance; and
  an inductive element coupled between the switch and the output node, the inductive element having a second resistance, wherein at least one of:
    the first resistances of the at least two converter stages match;
    the second resistances of the at least two converter stages match; or
    inductances of the inductive elements of the at least two converter stages match.

17. The multi-phase voltage converter of claim 16, wherein each of the at least two converter stages further comprises:
  another switch coupled between a reference potential node and a switching node coupled to the switch and to the inductive element, the other switch comprising a third resistance, wherein the third resistances of the at least two converter stages match.

18. The multi-phase voltage converter of claim 16, wherein in each of the at least two converter stages, the first resistance comprises a parasitic resistance of the switch and the second resistance comprises a parasitic resistance of the inductive element.

19. A method for fabricating a multi-phase voltage converter, comprising:
  disposing a first switch between a first input node and an output node of the multi-phase voltage converter, the first switch having a first resistance;
  disposing a first inductive element between the first switch and the output node, the first inductive element having a second resistance;
  disposing a second switch between a second input node and the output node of the multi-phase voltage converter, the second switch having a third resistance; and
  disposing a second inductive element between the second switch and the output node, the second inductive element having a fourth resistance, wherein at least one of:
    the first resistance and the third resistance match; or
    the second resistance and the fourth resistance match.

20. The method of claim 19, wherein the first input node and the second input node are the same node.

21. The method of claim 19, wherein inductances of the first inductive element and the second inductive element match.

22. The method claim 19, further comprising:
  disposing a third switch between a first reference potential node and a first switching node coupled to the first switch and to the first inductive element, the third switch having a fifth resistance; and
  disposing a fourth switch between a second reference potential node and a second switching node coupled to the second switch and to the second inductive element, the third switch having a sixth resistance, wherein the fifth resistance and the sixth resistance match.

23. The method of claim 19, wherein the first resistance, the second resistance, the third resistance, and the fourth resistance comprise parasitic resistances of the first switch, the first inductive element, the second switch, and the second inductive element, respectively.

24. A method for voltage conversion, comprising:
  generating an output signal at an output node of a multi-phase voltage converter using at least two converter stages coupled to the output node;
  filtering the output signal with a high-frequency filter to generate a filtered signal;
  comparing the filtered signal with a reference signal;
  generating drive signals for the at least two converter stages based on the comparing of the filtered signal with the reference signal;
  generating a comparison signal based on results of the comparing of the filtered signal with the reference signal; and
  filtering a high-frequency component of the comparison signal to generate another filtered signal, wherein the drive signals are generated based on the other filtered signal.

25. The method of claim 24, wherein the drive signals comprise pulse-width modulated (PWM) signals having matching duty cycles.

* * * * *